Aug. 28, 1928.
W. A. BARRETT
1,682,029
LIQUID HEATER
Filed Aug. 31, 1925
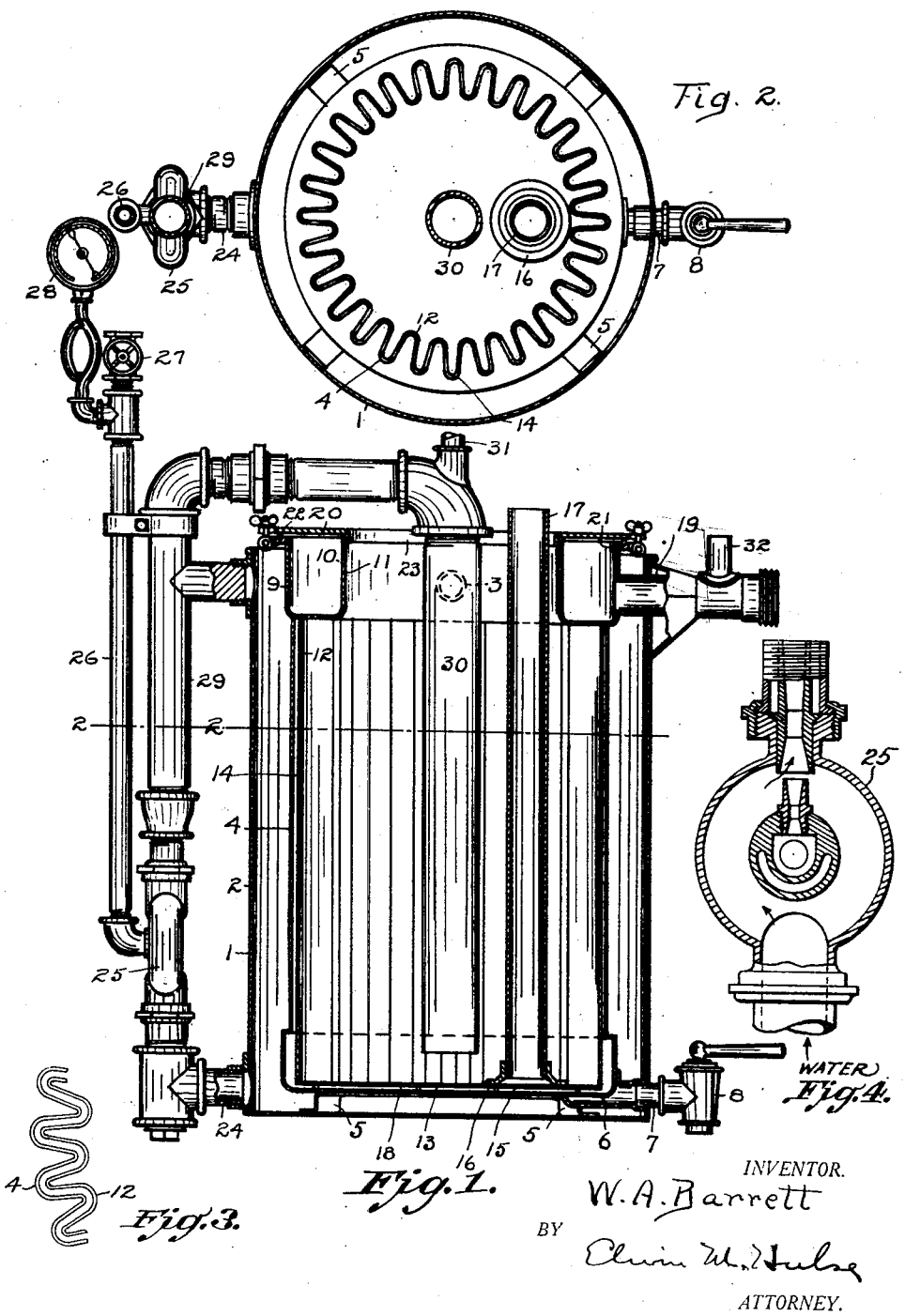
INVENTOR.
W. A. Barrett
BY
ATTORNEY.

Patented Aug. 28, 1928.

1,682,029

UNITED STATES PATENT OFFICE.

WALTER A. BARRETT, OF FORT WAYNE, INDIANA.

LIQUID HEATER.

Application filed August 31, 1925. Serial No. 53,496.

The invention relates to heaters for the heating of liquids, such as the Pasteurizing of milk, and its object is to provide a simple and compact device wherein is found a maximum of heating surface affording a large capacity, and in which the surfaces contacting with the treated liquid are readily cleaned.

The invention consists of two corrugated tanks one within the other and surrounded by a water jacket, between which tanks the liquid to be treated is caused to flow.

An embodiment of the invention is illustrated in the accompanying drawings in which, Figure 1 is a central, vertical cross-sectional view of a device embodying the invention, Fig. 2 a cross-sectional view on line 2—2 of Fig. 1. Fig. 3 a fragmentary detail view of the tank walls and Fig. 4 a vertical sectional view of the jet pump.

In the illustrative embodiment of the invention, 1 represents a tank, having its upright wall 2 preferably cylindrical and having its top open. An overflow pipe 3 is connected to this tank at a selected point below the upper edge thereof.

A tank 4 is mounted by the legs 5 upon the bottom of the tank 1, an opening 6 being formed in the bottom of the tank 4 about which a pipe 7 is secured. The pipe 7 is extended through the side of the tank 1 and a valve 8 controls the discharge of the contents of the tank 4 through this pipe when such discharge is desirable. The side wall of the tank 4 is vertically corrugated as shown in Fig. 2, the corrugations extending from the lower flared portion 4ª up to the flared portion of said wall that forms the outer wall 9 of an annular trough or chamber 10. The inner wall 11 of this trough is formed by the flared upper portion of the side wall of a second tank 12 that is disposed within the tank 4. The bottom 13 of the tank 12 is spaced in suitable manner from the bottom of the tank 4 and the side wall of the tank 12 is corrugated similarly to the side wall of the tank 4, the corrugations fitting within the corrugations of the tank 4 and spaced therefrom to form a narrow, vertical passageway 14 between the two tanks.

An opening 15 is formed in the bottom 13 of the tank 12 about which is secured a foot 16 that supports a pipe 17. This pipe extends upwardly above the top of the tank.

The liquid to be treated is inserted through the pipe 17 and passes into the space 18 between the bottoms of the two tanks 4 and 12, and then flows upwardly through the passageway 14 into the trough or chamber 10, from which it discharges through a pipe 19 that communicates with said chamber and is extended through the side wall of the tank 1.

The top of the trough or chamber 10 is closed by an annulus 20 that is preferably clamped in suitable manner upon a flange 21 formed on the outer wall of the trough, a gasket 22 being disposed between the annulus and the flange to provide a fluid tight joint. A depending annular flange 23 is formed in the inner periphery of the annulus which closely engages the outer surface of the inner wall 11 of the trough. The fit of the flange on the inner wall 11 of the trough is intended to be such that the heating medium hereafter described will not pass between them. If leakage occurs suitable packing may be placed between the two surfaces. I have not found that the heating medium—hot water—will pass between said surfaces where no packing is used between them. The trough is thereby protected against the passage into it of foreign substances.

A pipe 24 is connected to the tank 1 adjacent to its bottom and communicates with a steam jet pump 25 of suitable form, to which pump steam is supplied through the pipe 26 having a regulating valve 27 and a gauge 28 connected thereto. A pipe 29 is also connected to the pump and to a pipe 30 that is suspended within the tank 12 and extends well down toward the bottom thereof. A vent 31 releases any excess of steam flowing through the pipe 29.

A pipe 32 is connected to the pipe 19 and provides means by which a thermometer may be inserted to determine the temperature of the liquid that discharges through that pipe.

In operation water is supplied to the tank 12 until it overflows the annulus 20 and descends into the tank 1, filling it up to the overflow pipe 3. Steam is then admitted through the pipe 26 to operate the jet pump 25 and heat the water, the heated water passing through the pipes 29 and 30 into the tank 12, the pump drawing the water from the tank 1 and delivering it through the pipes 29 and 30 into the tank 12 from which the water continuously flows over the annulus back into the tank 1, thus establishing a continuous circulation of the heated water. Since the circulating hot water is in contact with both corrugated walls of the passageway 14 formed between the two inner tanks a maximum of heating surface is formed upon which the film of liquid contacts as it flows upwardly in said passageway. The liquid, therefore, is rapidly and effectively heated to the desired temperature.

The inner tank 12, being loosely supported in the tank 4, is readily removable therefrom after the pipe 30 and the annulus are removed, hence the parts with which the treated liquid, such as milk, contacts are easily cleaned.

What I claim is:

1. A heater comprising three receptacles one within the other, the intermediate receptacle being spaced from each of the others, the side walls of the intermediate and innermost receptacles being vertically corrugated and fit one within the other in spaced relation to form a transversely narrow passageway between said walls, a chamber communicating with the upper end of the passageway, means to conduct the liquid to be heated to the lower end of the passageway to cause the liquid to rise in a film in said passageway and discharge into the chamber, a heating medium in the outer and innermost receptacles and contacting with the said corrugated walls and means to withdraw the said medium from the outer receptacle and deliver it to the innermost receptacle from which latter receptacle the said medium overflows back into the outer receptacle for uniformly heating the said corrugated walls.

2. A heater comprising three open top receptacles one within the other and spaced one from the other, the vertical walls of the inner and intermediate receptacles being corrugated and fit one within the other in spaced relation to form a transversely narrow passageway surrounding the inner receptacle, an open top chamber formed on the upper portions of said vertical walls and communicating with the passageway, removable means to close the top of the chamber, a conduit extended through the inner receptacle and having communication with the lower end of the passageway, the inner and outer receptacles being adapted to receive a heating medium which contacts with the said corrugated walls and which is adapted to overflow from the inner receptacle into the outer receptacle, and means to continuously withdraw the said medium from the outer receptacle and deliver it to the inner receptacle.

In witness whereof I have hereunto set my hand this 18th day of August, 1925.

WALTER A. BARRETT.